United States Patent
Giuseppe

[11] Patent Number: 6,024,611
[45] Date of Patent: Feb. 15, 2000

[54] CIRCUIT BREAKER WITH DETACHABLE CONTACTS

[75] Inventor: Muscaglione Giuseppe, Viale, Italy

[73] Assignee: ABB Sace S.p.A., Bergamo, Italy

[21] Appl. No.: 08/897,026

[22] Filed: Jul. 18, 1997

[30] Foreign Application Priority Data

Jul. 19, 1996 [IT] Italy ................................ MI96A1506

[51] Int. Cl.[7] .................................................. H01R 4/48
[52] U.S. Cl. .......................................... 439/819; 439/821
[58] Field of Search .................................. 439/817, 819, 439/839, 251, 787, 788, 821

[56] References Cited

U.S. PATENT DOCUMENTS

| | | | |
|---|---|---|---|
| 2,386,611 | 10/1945 | Ileman | 439/819 |
| 2,704,838 | 3/1955 | Macha | 439/839 |
| 3,097,904 | 7/1963 | Yarrick et al. | 439/252 |
| 3,723,940 | 3/1973 | Leonard | 439/251 |
| 4,087,668 | 5/1978 | Ryoichi et al. | 200/254 |
| 4,983,132 | 1/1991 | Weidler | 439/251 |
| 5,098,318 | 3/1992 | Suter | 439/819 |
| 5,423,700 | 6/1995 | Takeuchi | 439/251 |
| 5,482,481 | 1/1996 | Hiroshi | 439/821 |

FOREIGN PATENT DOCUMENTS

| | | |
|---|---|---|
| 27 39 152 | 2/1979 | Germany . |
| 91 02 559 | 5/1991 | Germany . |
| 44 14 917 | 11/1994 | Germany . |

*Primary Examiner*—Neil Abrams
*Assistant Examiner*—Javaid Nasri
*Attorney, Agent, or Firm*—Guido Modiano; Albert Josif; Daniel J. O'Byrne

[57] ABSTRACT

A circuit breaker with detachable electric contact, constituted by plates (2,3) which are blanked or cut so as to form adjacent contact laminae (14) which define a seat (6;) for the insertion of a fixed current conducting bar (11) and a movable seat (5) for accommodating a detachable current distribution bar (10); spring elements (9) being also associated with the contact laminae (14) in order to elastically preload the laminae.

23 Claims, 5 Drawing Sheets

6,024,611

CIRCUIT BREAKER WITH DETACHABLE CONTACTS

BACKGROUND OF THE INVENTION

The present invention relates to a circuit breaker with a detachable electric contact, composed of a fixed part and of a movable part.

It is conventionally known to use, for example in electrical panels, current breakers composed of a fixed part which is permanently connected to the bars of the electric sower supply and distribution circuits.

The movable or removable structure of the breaker is connected to the fixed part of the breaker; the Dart accommodates, in a known manner, all the mechanisms for actuating and operating the breaker.

The provision of a fixed part and of a removable part which form the breaker has the advantage that for maintenance, inspection or replacement of the actuation mechanism it is possible to quickly uncouple the removable part, together with all the electrical and mechanical components, from the fixed Dart of the breaker, which is permanently connected to the electric power supply bars.

In conventional breakers, coupling and uncoupling between the fixed part and the movable part of the breaker currently occur with the aid of a C-shaped supporting structure which accommodates a plurality of mutually parallel laminae or plates arranged in a pack-like configuration, forming on the front side and on the rear side contact openings or jaws which allow electrical connection to the electric power supply and distribution bars.

The individual plates or laminae, arranged in a pack-like configuration, are supported by a supporting frame so that they can oscillate; in order to give the laminae of the jaws an elastic preloading, there is provided a set of springs which act on the individual laminae.

Conventional contacts which form connecting jaws and are constituted by a pack of plates or laminae, blanked in the shape of a jaw, and the preloading springs and the support constitute a constructive assembly which has a considerable weight and a certain constructive complexity. Work-intensive operations are also required for the assembly of the individual parts. Moreover, functionality, electrical behavior and most of all reliability of conventional jaw devices is unsatisfactory. Thus, for example, in the case of a considerable axial misalignment between the conducting bars of the fixed part and of the movable part, current flows only in some regions and not uniformly and evenly throughout the entire extension or width of the contact; dielectric phenomena also cause disturbances.

Another drawback which occurs in the above described conventional contacts is the plurality of different constructive elements required to provide the contact.

SUMMARY OF THE INVENTION

The aim of the present invention is to obviate the drawbacks of the prior art and to provide an electric contact for a disassemblable or detachable breaker which allows to connect a fixed part to a movable part of a breaker and does not have the above described drawbacks of the prior art, has a simplified construction and a very small number of components, is compact and most of all lighter and finally allows to achieve maximum reliability as regards conduction of electric current.

According to the present invention, the electric breaker, provided with detachable electric contacts, is characterized in that the contact comprises metal plates which are blanked or cut so as to define adjacent contact laminae which provide a first seat for inserting a fixed current-conducting bar and a second seat for accommodating a detachable current distribution bar.

Advantageously, spring means are associated with the adjacent contact laminae for the elastic pre-loading of the laminae.

Advantageously, the metal plates that form the laminae are parallel to each other and spaced with the aid of a spacer means, so as to form two mutually opposite seats which are clamp-shaped for the insertion of the conducting bars.

In another embodiment, the metal plates are shared plastically and arranged in a circle so as to form, together with the adjacent laminae, rings which accommodate the current conducting bars. Advantageously, two rings of laminae are mutually assembled, arranging the openings or the rings in opposite directions.

Advantageously, leaf springs are associated with the mutually parallel plates or laminae and act on the individual laminae.

In the case of laminae arranged in a ring, the free ends of the laminas are surrounded by a toroidal leaf spring.

It is also advantageous to provide one ring of laminae with a smaller or larger diameter than the second ring or laminae.

BRIEF DESCRIPTION OF THE DRAWINGS

The circuit breaker conceived according to the present invention is now described in greater detail and illustrated by means of some embodiments given by way of example in the accompanying drawings, wherein.

DESCRIPTION OF THE PREFERRED EMBODIMENTS

Figure 1:
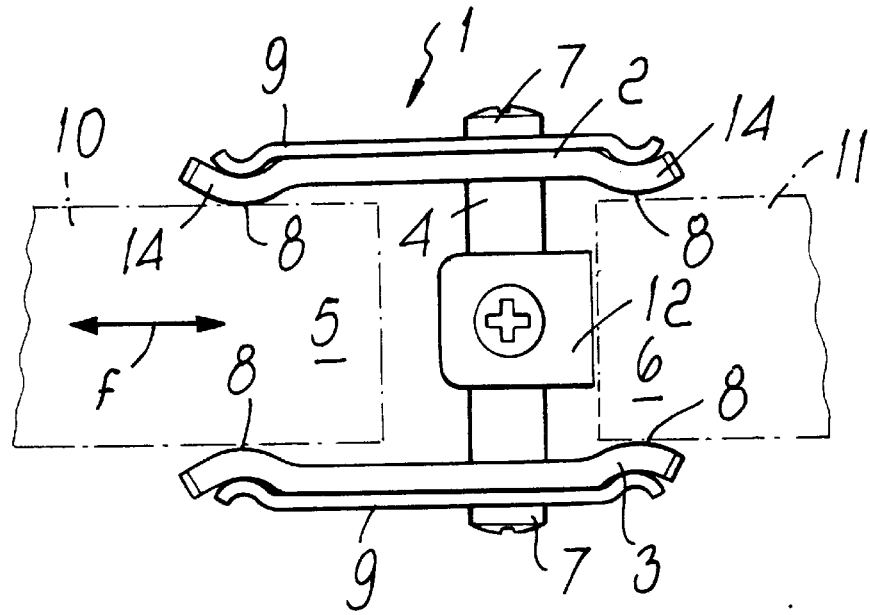
FIG. 1 is a view of a contact composed of two parallel bands of laminae.

As shown by FIG. 1, the contact illustrated and generally designated by the reference numeral 1 is constituted by two plates 2 and 3 which are made of metal, for example copper.

The plates 2 and 3 are kept spaced with the aid of a central rib 4 so as to form two mutually opposite openings 5 and 6 which are shaped like a clamp or jaw.

The plates 2 and 3 are connected to the spacer rib 4 by means of screws 7.

At its free ends, each plate has a region which is shaped or coined in an arc-like manner so as to form small contact surfaces. The arc-shaped regions are generally designated by the reference numeral 8.

The plates are preloaded by means of leaf springs 9.

Bars 10 and 11, for supplying and respectively distributing electric power, can be inserted in the clamp-like openings 5 and 6.

By means of the preloading that occurs with the aid of the leaf springs 9, the arc-like regions 8 of the laminae 14 are always in close contact with the conducting bars 10 and 11. Advantageously, the spacer rib 4 accommodates a bracket 12 which can be orientated; the bracket 12 is connected, for example with the aid of screws, to the ends of the bar 11 provided to supply electric power.

The clamp-like opening designated by the reference numeral 5 accommodates the distribution bar 10, which is part of the movable structure (f) of the breaker (nor shown).

Figure 2:
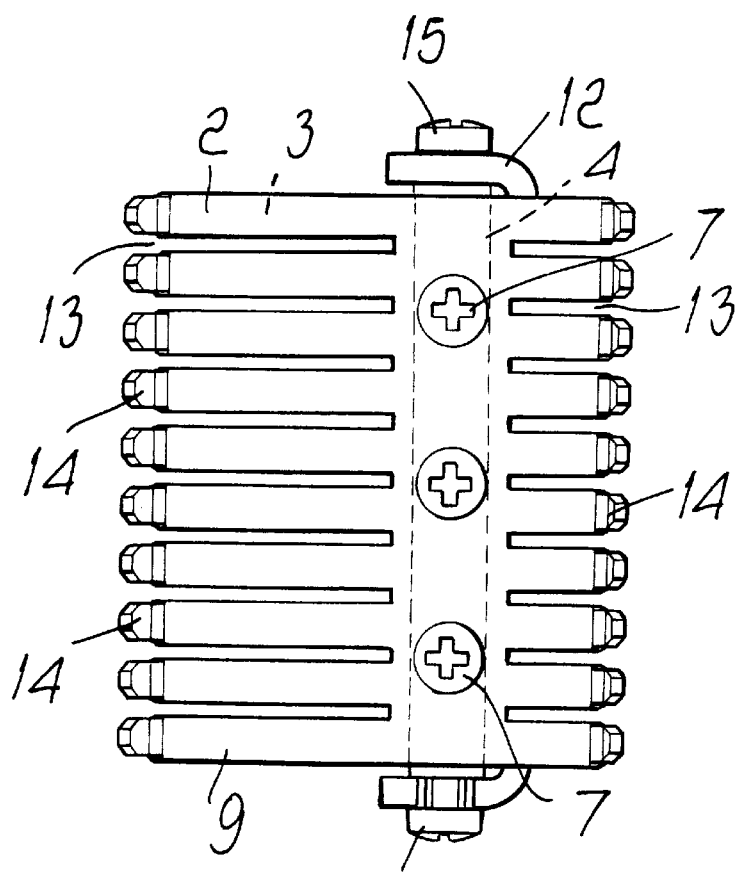
FIG. 2 is a plan view of the contact according to FIG. 1.

FIG. 2, which is a plan view of the contact 1, shows that the metal bands 2 and 3 have parallel notches 13 in of order to provide a plurality of adjacent laminae 14 which can move elastically.

FIG. 1 and 2 show the particular embodiment of the leaf spring 9, which is reloaded and tends to flex the laminae 14 towards the conducting bars 10 and 11.

The metal plates 2 and 3 and the springs 9 are firmly connected to the spacer rib 4 with the aid of screws 7.

By the provision of the bracket 12, which is connected to the rib 4 so that it can oscillate, the entire contact 1 can be firmly connected to the power supply bar 11, and by means of screws 15 which connect the bracket 12 to the spacer rib 4 it is possible to adapt (swivel) the bracket 12 with respect to the bar 11.

The plates 2 and 3 for forming the contact laminae 14 are provided, in the example according to FIG. 1 and 2, as flat bands arranged parallel to each other and produce an opening 5 and 6 which is clamp-shaped or jaw-shaped and is open at the two opposite sides.

Figure 3:
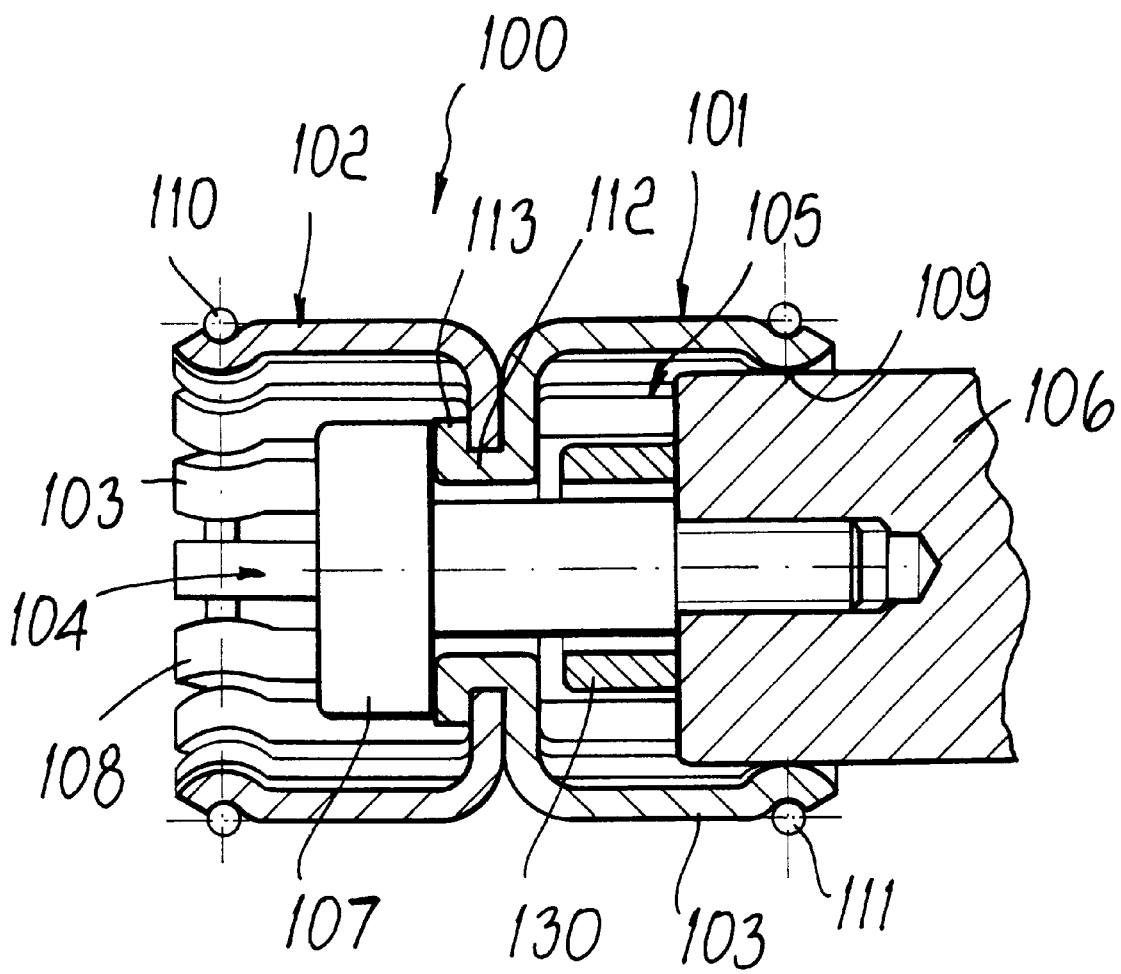
FIG. 3 is a sectional view of two contacts shaped like a ring of laminae and assembled together.

FIG. 3 is a sectional view of a contact 100 which is composed of two rings 101 and 102 made of suitably shaped metal plate. The rings 101 and 102 are formed circumferentially by laminae 103 which form openings 104 and 105 to allow the insertion of a cylindrical power supply bar 106 and of a current distribution bar (not shown).

Advantageously, the bar 106 is fixed inside the ring of laminae 101 with the interposition of a bush 130 and with the aid of a locking screw 107.

The cylindrical contact bar (not shown) which belongs to the removable structure of the breaker can be inserted in the opening 104 of the ring of laminae 102.

In order to ensure that the contact surfaces 108 and 109 of the laminae 103 are always in perfect contact with the power supply bar 106 and with the distribution bar respectively, the laminae 103 are surrounded, at their free ends, by an annular spring 110 and 111 respectively. The springs tend to press the laminae 103 permanently towards the inside of the rings 101 and 102.

Particularly advantageously, the ring 101 has a central collar 112 which passes through the bottom of the ring 102 and the end of the collar is shaped, at the bottom of the ring 102, so as to form a small circular element 113 which had a turned-back edge so as to firmly join the rings 101 and 102.

Figure 4:
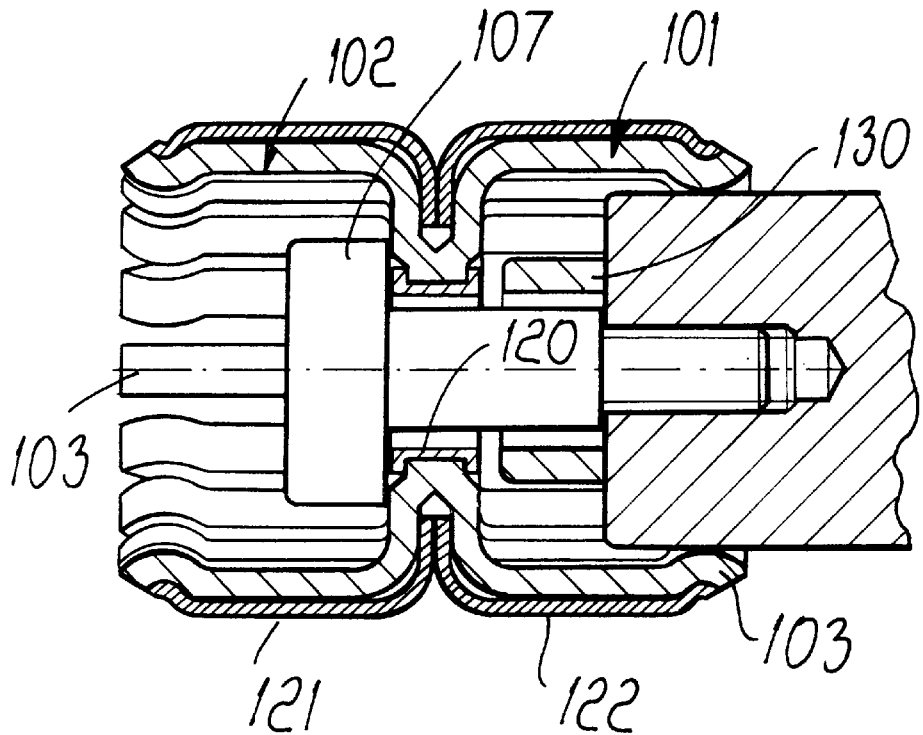
FIG. 4 is a sectional view of an annular lamina contact provided with a leaf spring which wraps around the annular contact.

In the example according to FIG. 4, the ring 101 is connected to the ring 102 with the aid of a tubular rivet 120 which allows the stem of the connecting screw 107 to 10 pass. Moreover, differently from FIG. 3, the laminae are surrounded by a ring, respectively 121 and 122, which lies circumferentially and is advantageously made of blanked harmonic steel shared so as to form laminae which coincide with the laminae 103.

The rings 121 and 122 made of harmonic steel act as spring means which tend to press the individual lamina 103 of the rings 101 and 102 towards the center of the jaw-like openings.

Figure 5:
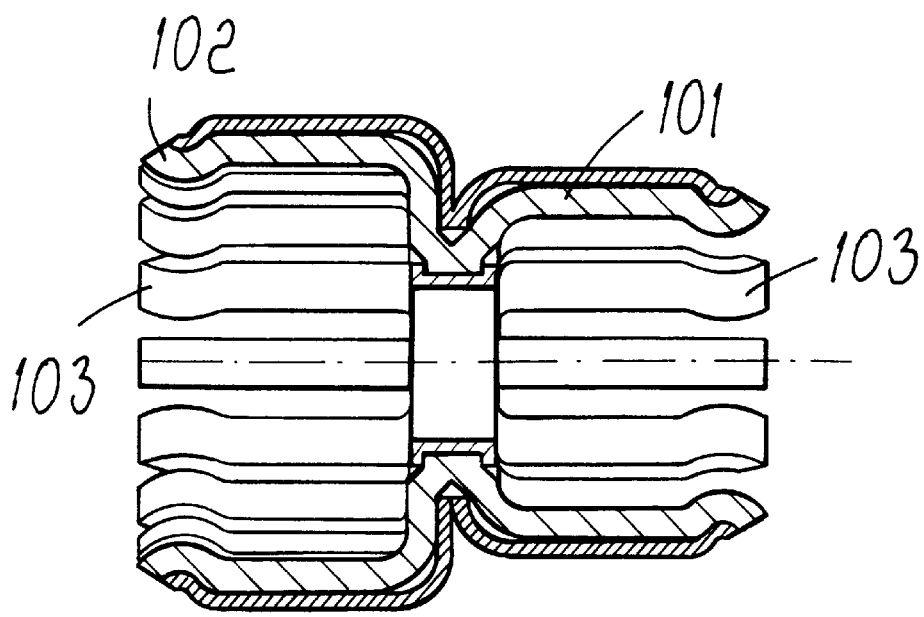
FIG. 5 is a sectional view of an annular contact according to FIG. 4, but with different annular diameters.

FIG. 5 illustrates another embodiment of the contact, which substantially corresponds to the contact shown in FIG. 4 except that the jaw-like opening diameter of the ring of laminae 102 is greater than the diameter of the opening of the ring of laminae 101.

This embodiment has the advantage that it allows to use power supply bars which have a different diameter than the electric power distribution bars or vice versa.

Figure 6:
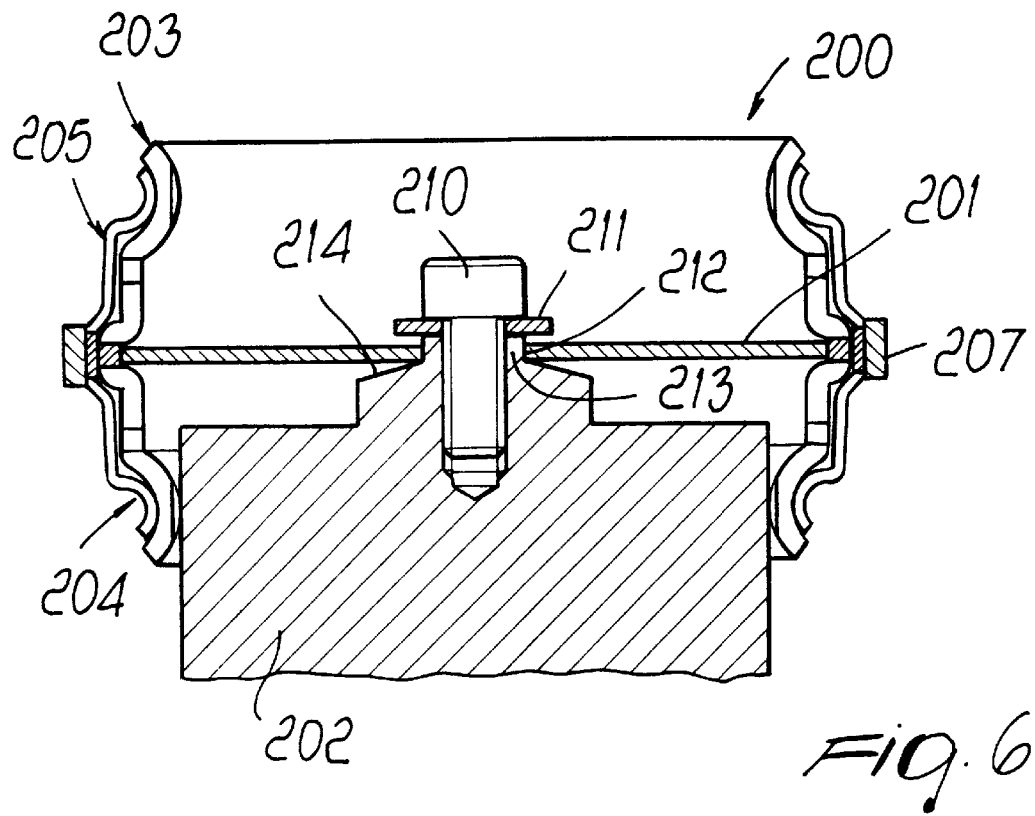
FIG. 6 is a sectional view of an annular contact with a disk-like element.
Figure 7:
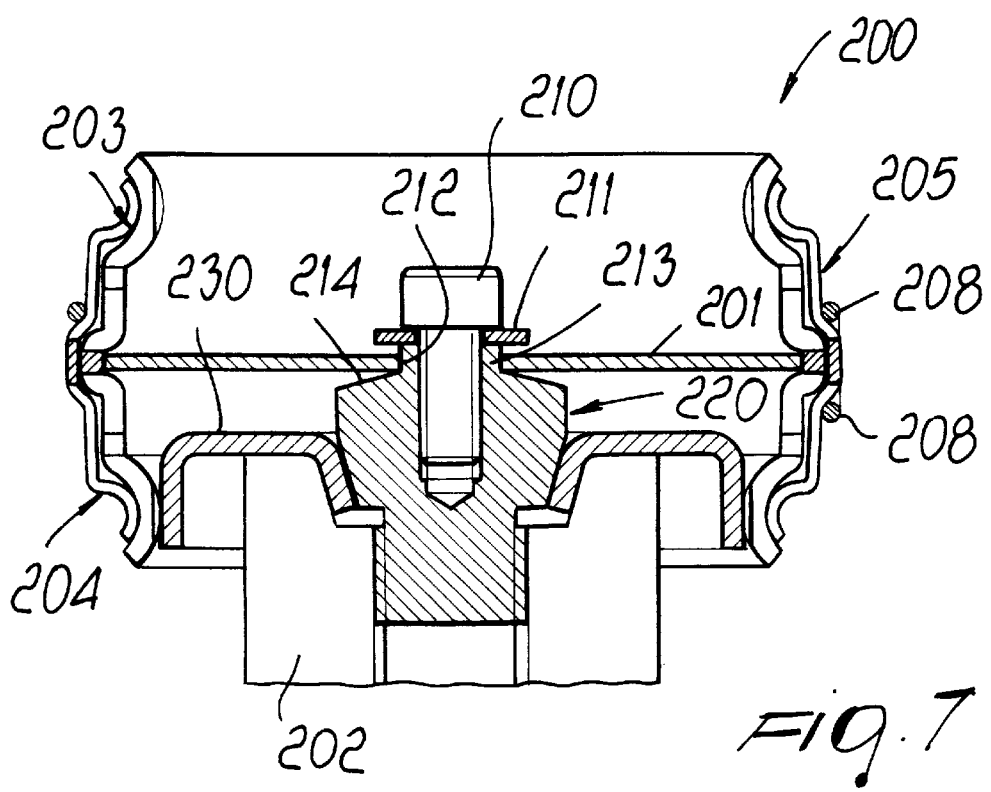
FIG. 7 is a sectional view of an annular contact with a smaller fixed bar and a diameter adapter.
Figure 8:
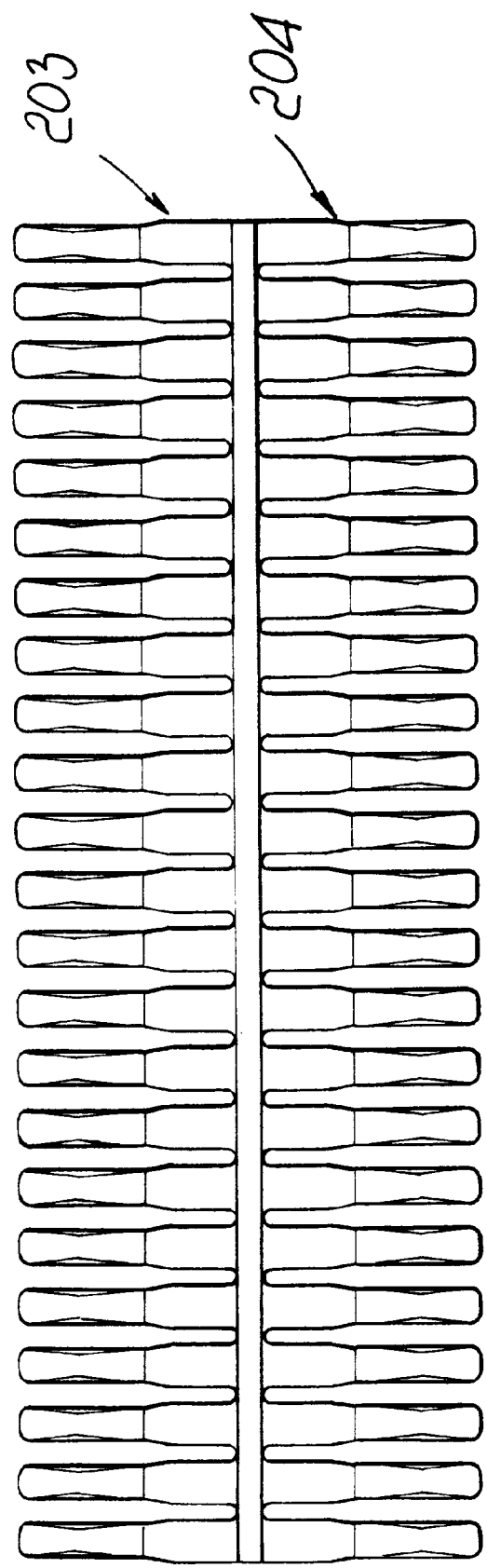
FIG. 8 is a schematic view of a strip which forms the blanked contact laminae, projected onto a plane.

With reference to FIG. 6 to 8, those figures illustrate an annular contact with a disk-like element, generally designated by the reference numeral 200, which has a supporting disk-like element 201 connected, as explained hereinafter, to the fixed bar 202. A ring of laminae 203 and 204 is provided at the peripheral region of the disk-like element 201; the laminae are respectively directed towards the moving contact bar and towards the fixed contact bar 202.

The laminae 203 and 204, as shown more clearly in FIG. 8, can be obtained by blanking a strip of copper which is shaped so that it assumes the intended configuration.

Moreover, it is optionally possible to provide individual laminae which are inserted in corresponding notches formed in the peripheral region of the disk-like element.

The laminae obtained from the strip or produced individually are surrounded and retained externally by a leaf spring 205 which can be kept in position by means of an external containment ring 207 arranged at the peripheral region of the disk-like element 201 or optionally by means of elastic rings 208, as shown in FIG. 7, which engage the ring or laminae 203 and the ring of laminae 204.

In order to allow the ring of laminae to oscillate, the disk-like element 201 is retained in position by means of a screw, 210 which retains a flange 211 which lies above the hole 212 in which a tang 213 forced on the fixed contact engages.

In order to guide the oscillation, the fixed contact has a frustum-shaped end 214 which allows a slight oscillation of the disk-like element 201 and accordingly of the entire lamina contact.

This shape, instead of being provided monolithically on the bar 202, as described in FIG. 6, can be provided on an insert 220 connected to the bar 202.

In order to compensate for the different diameters of the fixed bars 202, as shown in FIG. 7, it is possible to provide an adaptor flange 230, which is fixed to the smaller bar so as to make it assume the dimensions of the maximum-size bar for which the dimensions of the lamina contact are chosen.

The adaptor flange, as shown in FIG. 7, can be retained in position by using the coupling of the insert 220.

The invention thus conceived is susceptible of numerous modifications and variations, all of which are within the scope of the inventive concept.

All the details may also be replaced with other technically equivalent elements.

In practice, the materials employed, as well as the contingent shapes and dimensions, may be any according to the requirements.

What is claimed is:

1. An electric circuit breaker composed of a fixed part and a detachable part, provided with detachable electrical contacts, wherein the contacts comprise metal plates which are blanked or cut so as to define adjacent contact laminae which are connected one to another and form a first seat for inserting a fixed current conducting bar and a second seat for accommodating a detachable current distribution bar, said contact laminae being spaced one from another and extending from a common central portion of said metal plates so as to elastically abut against the fixed current conducting bar and the detachable current distribution bar.

2. The electric circuit breaker according to claim 1, wherein spring means for an elastic preloading of the laminae are associated with the adjacent contact laminae.

3. The electric circuit breaker according to claim 1, wherein the metal plates that define the laminae are mutually parallel and are spaced by means of a spacer, forming two mutually opposite clamp-shaped seats for the insertion of the conducting bars.

4. The electric circuit breaker according to claim 3, wherein the spacer accommodates a bracket which can be orientated and in that said bracket is firmly connected to a free end of the bar provided for supplying power.

5. The electric circuit breaker according to claim 1, wherein the metal plates are deformed plastically and are arranged in a circle so as to form, together with the adjacent laminae, rings which accommodate the current conducting bars.

6. The electric circuit breaker according to claim 5, wherein the rings of laminae are assembled by means of a tubular rivet and in that the rivet is crossed by the stem of a connecting screw.

7. The electric circuit breaker according to claim 5, wherein free ends of the laminae are arranged in a circle and are surrounded by a toroidal leaf spring.

8. The electric circuit breaker according to claim 7, wherein the free ends of the laminae have, in a circumferential direction, a groove which accommodates an annular spring.

9. The electric circuit breaker according to claim 7, wherein the free ends of the laminae have contact surfaces which rest on the electric power supply or distribution bars.

10. The electric circuit breaker according to claim 5, wherein the rings of laminae have different diameters.

11. The electric circuit breaker according to claim 1, wherein two rings of laminae arranged in a circle are mutually assembled, providing openings for accommodating the conducting bars, said openings being orientated in opposite directions.

12. The electric circuit breaker according to claim 11, wherein a first one of said rings of laminae has a central collar which passes through the bottom of the other ring of laminae and in that at the bottom of a second one of said rings of laminae the end of the collar is deformed, forming a circular element for mutually assembling the rings.

13. The electric circuit breaker according to claim 1, wherein leaf springs are associated with the plates provided with mutually parallel laminae and preload the individual laminae.

14. The electric circuit breaker according to claim 13, further comprising a disk-like element which is associable with the fixed current conducting bar, rings of laminae being associated with a peripheral region of said disk-like element and forming the first seat for the insertion of said fixed current conducting bar and the second seat for accommodating the detachable current distributing bar.

15. The electric circuit breaker according to claim 14, further comprising a leaf spring which surrounds said rings of laminae in order to apply elastic pressure in a substantially radial direction.

16. The electric circuit breaker according to claim 15, wherein said laminae are constituted by a plurality of laminae which are individually accommodated in notches formed in the peripheral region of said disk-like element and are retained in position by said leaf spring.

17. The electric circuit breaker according to claim 15, further comprising an outer annular element which engages said leaf spring substantially at said disk-like element.

18. The electric circuit breaker according to claim 14, further comprising elastic rings which can engage said leaf spring on opposite sides with respect to said disk-like element.

19. The electric circuit breaker according to claim 14, wherein said disk-like element is associated with a cylindrical tang rigidly coupled to said fixed current conducting bar and arranged at the end of a portion which is shaped substantially like a frustum-shaped surface for the oscillation of said disk-like element with respect to said fixed current conducting bar.

20. The electric circuit breaker according to claim 19, wherein said shaped portion is formed monolithically on the end of said fixed current conducting bar.

21. The electric circuit breaker according to claim 19, wherein said shaped portion is formed on an insert which is connected to said fixed current conducting bar.

22. The electric circuit breaker according to claim 21, further comprising an adaptor flange which can be coupled to the bar of said bars which has the smallest diameter in order to make said diameters assume the same value.

23. The electric circuit breaker according to claim 22, wherein said adaptor flange is connected to said fixed current conducting bar by means of said insert.

* * * * *

UNITED STATES PATENT AND TRADEMARK OFFICE
CERTIFICATE OF CORRECTION

PATENT NO. : 6,024,611
DATED : February 15, 2000
INVENTOR(S) : Giuseppe MUSCAGLIONE It is certified that error appears in the above-identified patent and that said Letters Patent is hereby corrected as shown below:

On the title page: Item

Muscaglione [19]

[75] Inventor: Giuseppe Muscaglione, Pontirolo Nuovo, Italy

Signed and Sealed this

Twenty-fourth Day of April, 2001

*Attest:*

NICHOLAS P. GODICI

*Attesting Officer*  *Acting Director of the United States Patent and Trademark Office*